United States Patent
Woo

(10) Patent No.: US 7,257,826 B2
(45) Date of Patent: Aug. 14, 2007

(54) DISK CHANGER

(75) Inventor: Jisung Woo, Hong Kong (HK)

(73) Assignee: Thomson Licensing, Boulogne-Billancourt (FR)

( * ) Notice: Subject to any disclaimer, the term of this patent is extended or adjusted under 35 U.S.C. 154(b) by 628 days.

(21) Appl. No.: 10/451,121

(22) PCT Filed: Dec. 7, 2001

(86) PCT No.: PCT/EP01/14427

§ 371 (c)(1),
(2), (4) Date: Dec. 24, 2003

(87) PCT Pub. No.: WO02/50828

PCT Pub. Date: Jun. 27, 2002

(65) Prior Publication Data

US 2004/0095854 A1    May 20, 2004

(30) Foreign Application Priority Data

Dec. 20, 2000  (EP) .................................. 00127966

(51) Int. Cl.
*G11B 17/03*  (2006.01)
(52) U.S. Cl. ...................... 720/615; 720/699
(58) Field of Classification Search ............ None
See application file for complete search history.

(56) References Cited

U.S. PATENT DOCUMENTS

| 4,039,195 | A | * | 8/1977 | Iyeta | 369/220 |
| 4,098,510 | A | * | 7/1978 | Suzuki et al. | 720/626 |
| 5,056,077 | A | * | 10/1991 | Morikawa et al. | 720/624 |
| 5,115,419 | A |  | 5/1992 | Akiyama et al. | 369/37 |
| 5,193,079 | A | * | 3/1993 | Ko et al. | 369/30.94 |
| 5,270,989 | A | * | 12/1993 | Kimura | 369/30.93 |
| 5,293,362 | A | * | 3/1994 | Sakurai et al. | 369/30.8 |
| 5,654,944 | A |  | 8/1997 | Lee et al. | 369/32 |
| 5,742,571 | A |  | 4/1998 | Hoshino et al. | 369/37 |
| 5,903,527 | A | * | 5/1999 | Park | 369/37.01 |
| 6,222,799 | B1 | * | 4/2001 | Lee | 369/30.3 |

FOREIGN PATENT DOCUMENTS

JP       08180570 A  *  7/1996

* cited by examiner

*Primary Examiner*—William Korzuch
*Assistant Examiner*—Tawfik Goma
(74) *Attorney, Agent, or Firm*—Joseph J. Laks; Harvey D. Fried; Patricia Verlangieri

(57) ABSTRACT

A disk changer for CD and DVD disks including a rotatable platter with several slots each adapted for receiving a disk generally needs two optical sensors. The first sensor is adapted for detecting the number of a related slot of the platter and for providing a stop signal for the rotation of the platter. The second sensor is adapted for detecting the presence or absence of a disk in a given slot. Said sensors and their associated evaluation circuits are expensive components. Therefore it is an object to simplify the means for realizing said sensors. Said second sensor has the form of a link hingedly mounted between its two ends a first end of the link contacting the surface of the disk and a second end of the link cooperating with said first optical sensor. By this solution said second sensor and its associated evaluation circuit can be omitted substantially reducing the total costs of the changer.

9 Claims, 4 Drawing Sheets

DISK CHANGER

This application claims the benefit, under 35 U.S.C. § 365 of International Application PCT/EP01/14427, filed Dec. 7, 2001, which was published in accordance with PCT Article 21(2) on Jun. 27, 2002 in English and which claims the benefit of European patent application No. 00127966.0, filed Dec. 20, 2000.

TECHNICAL FIELD

The present invention relates to a disk changer especially adapted for CD or DVD disks.

BACKGROUND OF THE INVENTION

A disk changer adapted for CD or DVD disks generally includes a rotatable plate with several slots each for receiving a disk. The platter can be rotated on the chassis of the changer so that a desired disk can be moved to a playback unit optically reading the disk especially from the underside of the disk. Such an arrangement generally needs for proper operation two sensors. The first sensor generally in form of an optical sensor is adapted for sensing the number of a slot. Each slot carries some ribs of different number and size. Number and size of the ribs represent a code for the number of the respective slot. A sensor is provided on the chassis of the changer evaluating number and size of the ribs passing through the sensor during rotation of the platter. In this way each slot can be identified for feeding a disk to the playback unit the user wants to be reproduced. The second sensor is adapted to detect whether a disk is loaded in a given slot or not. This is useful, for example, to ignore or to skip a slot not containing a disk during a search operation by rotation of the platter in order to minimize the access time needed for finding a desired disk. Alternatively or additionally the second sensor can control a display unit showing which slot contains a disk and which slot does not contain a disk. The second sensor is not needed to be an optical sensor and may also be a mechanical sensor or whatever.

In fact, for both purposes several optical sensors and associated evaluation circuits are needed substantially increasing the total costs of the changer.

BRIEF SUMMARY OF THE INVENTION

It is an object of the invention to simplify the means needed for implementing said sensors and thereby decreasing the costs of the changer without jeopardizing the described functions. This object is solved by the invention as defined in claim 1. Advantageous embodiments and further developments of the invention are defined within the dependent claims.

According to the invention said second sensor has the form of a link hingedly mounted between its two ends a first end of the link contacting the surface of the disk and a second end of the link cooperating with said first optical sensor. That means said second optical sensor provided up to now for detecting whether a disk is loaded in the related slot is replaced by a simple link not optically but physically detecting the presence of a disk in the related slot. The position of the link being dependent from the presence or absence of a disk in a given slot influences said first optical sensor already available for detecting the number of the related slot and for providing a signal for stopping the rotation of the platter at the correct playback position. Therefore said second separate optical sensor for detecting the presence or absence of a disk in a given slot and its associated evaluation circuit are no more needed.

A single common link may be provided for all slots being hingedly mounted on the chassis of the changer. In this embodiment the detection of the presence of a disk is carried out sequentially from slot to slot during the rotation of the platter. Preferably, however, an individual link is provided for each slot being hingedly mounted on the platter near the edge of the related slot. In this embodiment the detection of the presence of a disk can be carried out individually for each slot. For example the detecting of the presence of a disk can be carried out simultaneously for all slots at the beginning of the operation of the changer.

In principal the link can be positioned underneath the platter as well as above the platter. In the first case the first end of the link abuts the underside of the disk if present in the related slot and in the second case the link abuts the topside of the disk.

In one embodiment of the invention the first end of the link has the form of a knob abutting the surface of the disk. Preferably the knob is provided with a soft surface or coating for avoiding a damaging of the surface of the disk. The second end of the link preferably has the form of a rib engaging an opening of the first optical sensor.

According to a further embodiment of the invention the bottom of the platter includes an aperture in the region of the first end of the link enabling the passage of the first end of the link if no disk is loaded in the related slot. This solution ensures a sufficient difference in the two positions of the link for presence and absence of the disk in spite of the rather low value of the thickness of the disk.

Preferably the first end of the link abuts the inner region of the disk not containing tracks with recorded information. This feature avoids on the one hand damaging of tracks including information by the link. On the other hand the link can abut both conventional disks like CD's and smaller disks with a substantially smaller diameter.

BRIEF DESCRIPTION OF THE DRAWINGS

In the following some example embodiments of the present invention will be described by way of the attached drawing wherein

FIG. 1 shows a chassis 1 of a disk changer and a platter 2 rotatable mounted on the chassis 1. The platter contains five slots 3 each adapted to receive a disk 4. For playback of a desired disk the platter 2 is rotated until the desired disk is in a position above a playback unit (not shown) underneath the disk 4 optically reading the disk 4 at its underside.

The following FIGS. 2-8 show the structures upside down in order to better show the structure being arranged underneath the platter. FIG. 2 shows the platter 2 containing a number of ribs 5 for each of slot 3. Ribs 5a of narrow width represent a code for the number of the related slot 3 wherein for example three ribs indicate the slot or disk number 3. Ribs 5b of larger width indicate the position of the platter 2 for stopping the platter 2 during rotation at the correct playback position. The width of ribs 5a for numbering and of ribs 5b for positioning the platter 2 are chosen in such a way that a single sensor 6 mounted on a chassis 1 will be able to distinguish three types of ribs, via software for example. All ribs 5 are evaluated by an optical sensor 6 one leg of the sensor emitting and the other receiving light when the ribs 5 pass between the legs of sensor 6 during rotation of the platter 2. Sensor 6 counts the number of the ribs 5a for indicating the number of the related slot 3. When the light of position sensor 6 passes through the fence between the ribs of a pair 5b the driving motor for the platter 2 stops the rotation of the platter 2. Furthermore the platter 2 includes a second optical sensor 7 for detecting whether a disk is loaded in the related slot 3 or not. If no such disk detector 7 would be used the pick-up would try to focus at each slot even at a slot not containing a disk. This would result in an undesired slow operation during search operation for a special disk. The sensor 7 includes emitting and receiving diodes. The light passes through the opening between two legs of the sensor 7 and is reflected by the disk if a disk is present at the related slot 3. In FIG. 2 everything except for the two sensors 6 and 7 is moulded into a single piece of plastic material.

Sensor 6 is not needed to be an optical sensor and may also be a mechanical sensor or a similar sensor. Sensor 7, however, generally needs to be an optical sensor. Sensor 7 also may control a display unit showing which slot contains a disk and which slot does not contain a disk.

Figure 1:
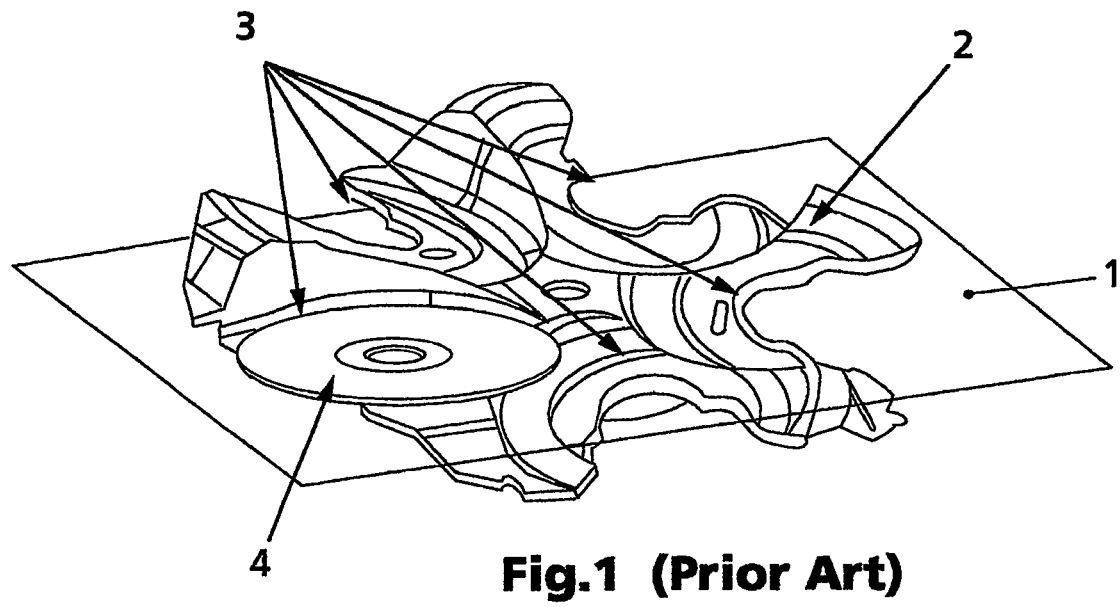
FIG. 1 is a perspective view of a platter loaded with one disk according to prior art.
Figure 2:
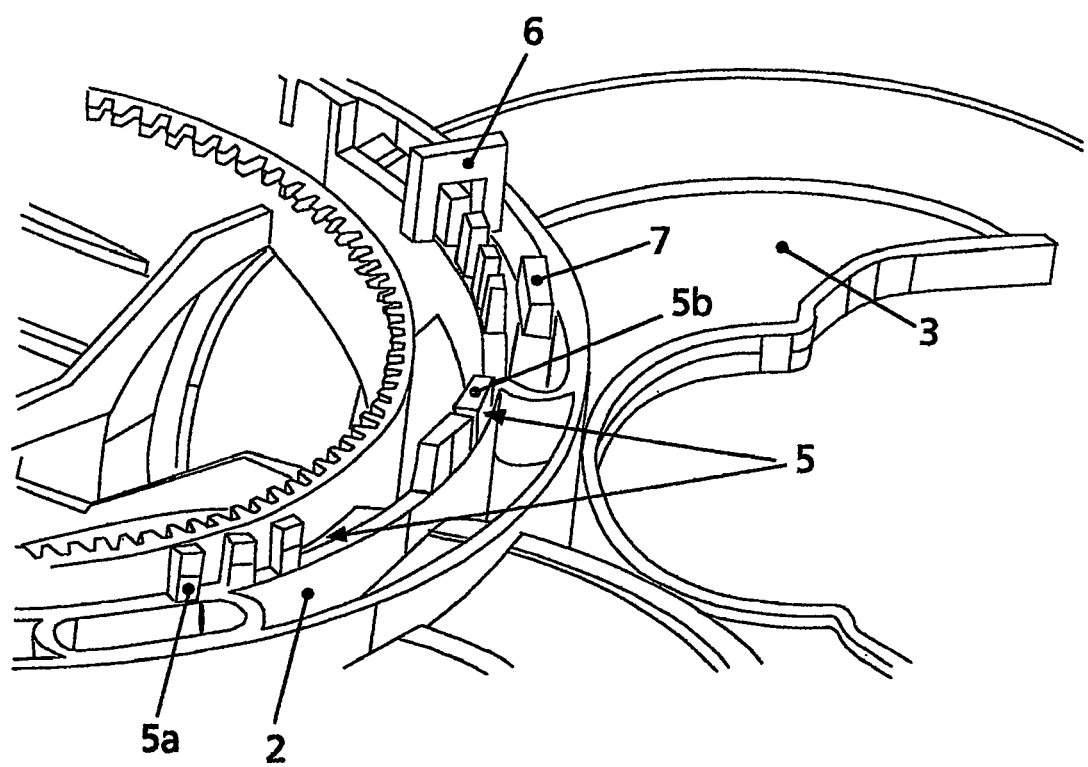
FIG. 2 shows a platter with a number of ribs representing a code for a given slot, a first optical sensor for evaluating the number of a slot and a second optical sensor for detecting the absence or the presence of a disk in a given slot according to prior art.
Figure 3:
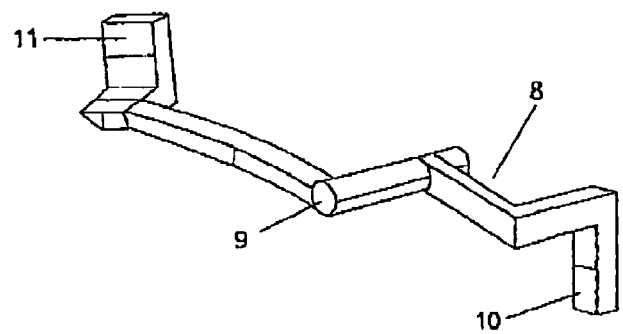
FIG. 3 shows a link according to the present invention alone.

FIG. 3 shows a link 8 performing the function of sensor 7 of FIG. 2 and thereby replacing and eliminating sensor 7. The link 8 is pivotally mounted at an hinge 9 on platter 2. One end of link 8 carries a knob 10 abutting a disk 4 if loaded in the related slot 3. Preferably knob 10 abuts the inner area of the disk that means the area without recorded information. The other end of link 8 carries a rib 11 cooperating with optical sensor 6. Ribs 11 of the five links 8 associated to the five slots 3 are placed on the same circular path as the other ribs 5 of FIG. 2.

Figure 4:
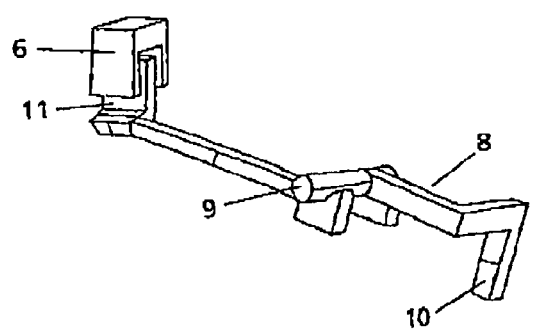
FIG. 4 shows said link together with an associated optical sensor.

FIG. 4 shows the position of link 8 in case no disk is loaded in the related slot. Knob 10 does not abut the surface of a disk and moves downward. Thereby rib 11 moves upward and engages sensor 6. Thereby sensor 6 provides a signal indicating that no disk is loaded in the related slot. This signal may be fed to a processor for ignoring or skipping said slot during a search operation for a slot including the desired disk.

Figure 5:
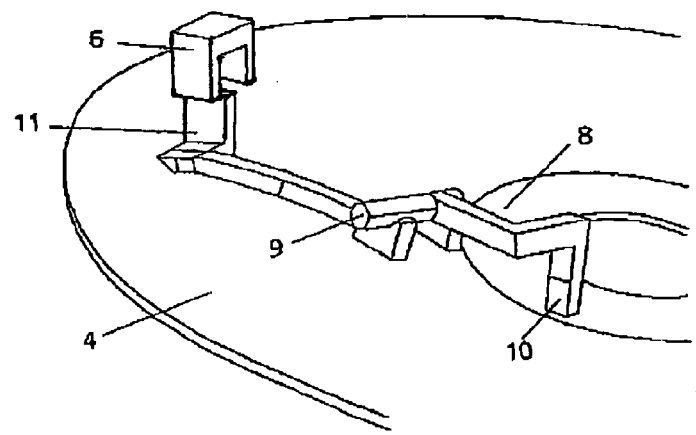
FIG. 5 shows the structure of FIG. 4 together with an associated disk.

FIG. 5 shows the case wherein a disk 4 is loaded in the related slot. Now knob 10 abuts the surface of disk 4 and cannot move downward. Therefore rib 11 cannot move upward and does not engage sensor 6. Sensor 6 thereby provides a signal indicating that a disk 4 is loaded in the slot. This signal may be fed to a processor and causes that the platter stops during its rotation for a playback operation.

Figure 6:
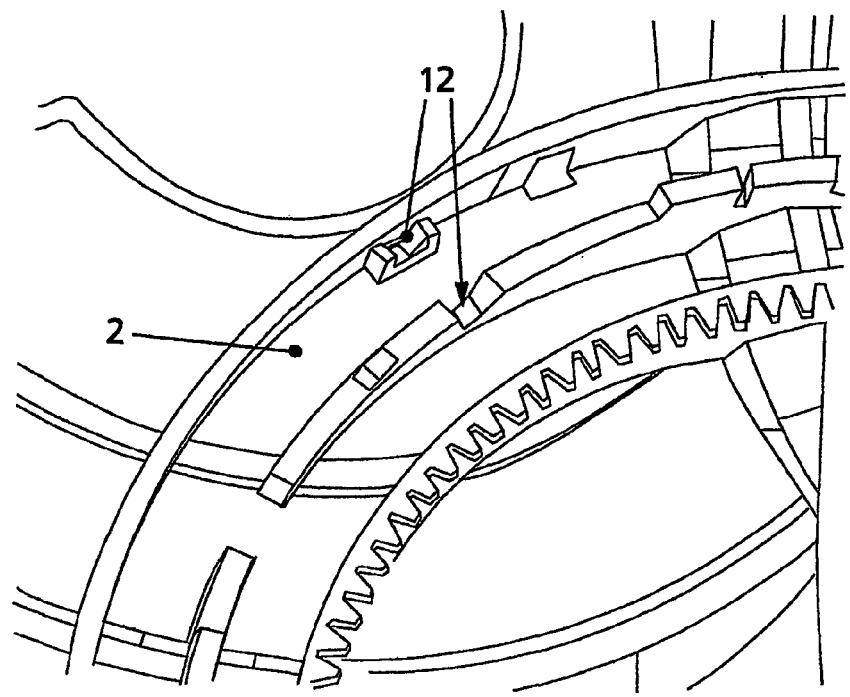
FIG. 6 shows a platter together with a hinge support for the link without the link.

FIG. 6 shows the platter 2 together with an hinge support 12 for link 8 for pivotally mounting of link 8 at platter 2 as described in connection with FIGS. 3-5.

Figure 7:
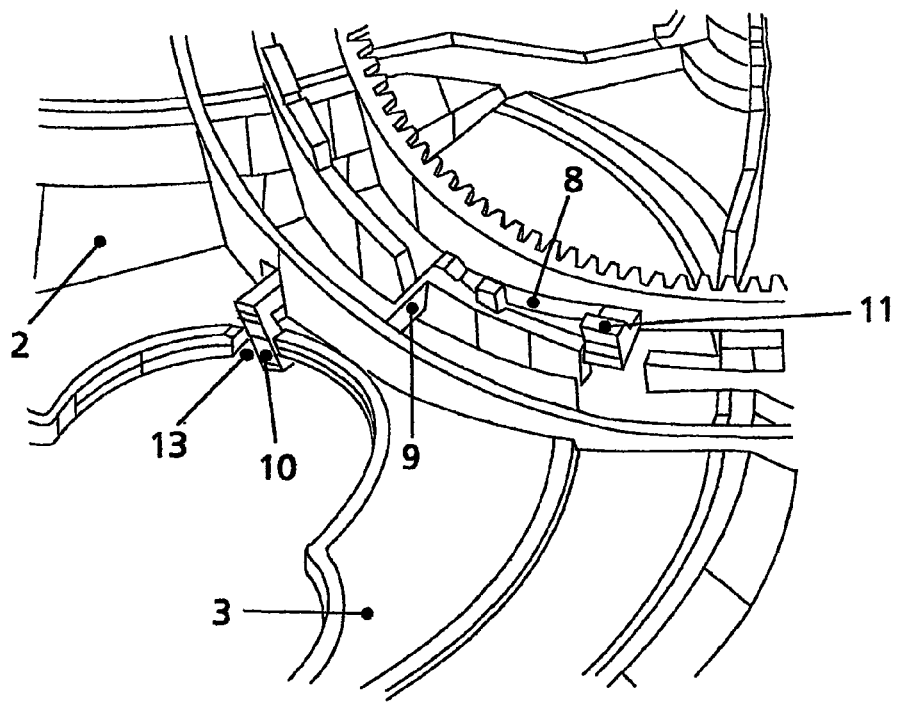
FIG. 7 shows a platter together with the link with no disk loaded in the related slot and FIG. 8 shows the structure of FIG. 7 with a disk loaded in the related slot.

FIG. 7 shows the case wherein no disk is loaded in slot 3 of platter 2. The knob 10 does not abut surface of a disk and engages an aperture 13 within platter 2. So rib 11 of link 8 moves upward and engages sensor 6 as already explained in connection with FIG. 4.

Figure 8:
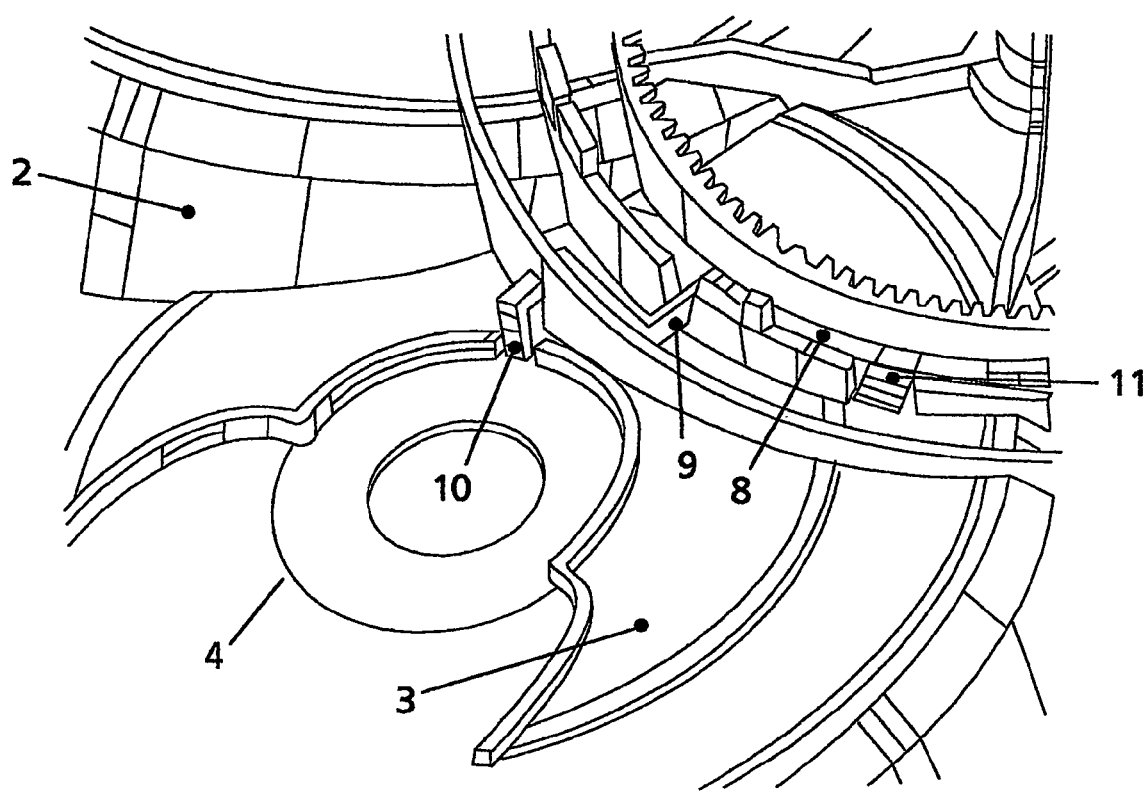

FIG. 8 shows the same structure as FIG. 7 but for the case wherein a disk 4 is loaded in slot 3 of platter 2. Rib 10 of link 8 abuts loaded disk 4 and cannot move downward. Therefore rib 11 cannot move upward and cannot engage sensor 6 as already described in connection with FIG. 5.

As can be seen no separate special optical sensor is needed for detecting whether a disk is loaded in a related slot since sensor 6 already provided for detecting number of slot is additionally used for detecting absence or presence of a disk in a related slot. Single sensor 6 can detect three items:
1. Number of disk slot
2. Platter position for stopping rotation at the correct rotation angle for playback
3. Detecting absence or presence of a disk in a related slot.

That means that additional sensor 7 of FIG. 2 and associated evaluation circuit can be omitted thereby reducing the total costs of the disk changer.

The invention claimed is:

1. Disk changer including a rotatable platter with several slots each adapted for receiving a disk, further including a first sensor for detecting the number of the respective slot and a second sensor for detecting whether a disk is loaded in a given slot, wherein said second sensor has the form of a link hingedly mounted between its two ends a first end of the link contacting the surface of the disk and a second end of the link cooperating with said first sensor.

2. Disk changer according to claim 1, wherein a single common link is provided for all slots being hingedly mounted on the chassis of the changer.

3. Disk changer according to claim 1, wherein an individual link is provided for each slot being hingedly mounted on the platter near the edge of the related slot.

4. Disk changer according to claim 1, wherein the link is positioned above the platter the first end of the link contacting the upper surface of the disk.

5. Disk changer according to claim 1, wherein the link is positioned underneath the platter the first end of the link contacting the underside of the disk.

6. Disk changer according to claim 1, wherein the first end of the link has the form of a knob abutting the surface of the disk.

7. Disk changer according to claim 1, wherein the second end of the link has the form of a rib engaging an opening of the first optical sensor.

8. Disk changer according to claim 1, wherein the bottom of the platter includes an aperture in the region of the first end of the link enabling a passage of the first end of the link if no disk is loaded in the related slot.

9. Disk changer according to claim 1, wherein the first end of the link abuts the inner region of the disk not containing a recorded information.

* * * * *